United States Patent [19]

Natesh et al.

[11] Patent Number: 5,728,769
[45] Date of Patent: Mar. 17, 1998

[54] AQUEOUS URETHANE RESINS AND COATING COMPOSITINS HAVING ENHANCED HUMIDITY RESISTANCE

[75] Inventors: Anbazhagan Natesh, Marshall Township, Allegheny County; Shanti Swarup, Hampton Township, Allegheny County, both of Pa.; Mary Ellen Rosenberger, Bay Village, Ohio

[73] Assignee: PPG Industries, Inc., Pittsburgh, Pa.

[21] Appl. No.: 668,901

[22] Filed: Jun. 24, 1996

[51] Int. Cl.$^6$ ............... C08J 3/00; C08K 3/20; C08L 75/00

[52] U.S. Cl. ............ 524/591; 524/539; 524/839; 524/840

[58] Field of Search ................ 524/591, 539, 524/839, 840

[56] References Cited

U.S. PATENT DOCUMENTS

| | | | |
|---|---|---|---|
| 3,684,758 | 8/1972 | Honig et al. | 260/29.6 |
| 3,705,164 | 12/1972 | Honig et al. | 260/29.6 |
| 4,198,330 | 4/1980 | Kaizerman et al. | 260/29.6 |
| 4,318,833 | 3/1982 | Guagliardo | 524/457 |
| 4,444,975 | 4/1984 | Pokorny | 528/49 |
| 4,632,860 | 12/1986 | D'Antonio et al. | 428/290 |
| 4,644,030 | 2/1987 | Loewrigkeit et al. | 524/457 |
| 4,647,612 | 3/1987 | Ranka et al. | 524/458 |
| 4,791,168 | 12/1988 | Salatin et al. | 524/601 |
| 4,822,685 | 4/1989 | Perez et al. | 428/423.3 |
| 4,880,867 | 11/1989 | Gobel et al. | 524/507 |
| 5,071,904 | 12/1991 | Martin et al. | 524/458 |
| 5,118,752 | 6/1992 | Chang et al. | 524/521 |
| 5,137,961 | 8/1992 | Goos et al. | 524/457 |
| 5,173,526 | 12/1992 | Vijayendran et al. | 524/457 |
| 5,270,433 | 12/1993 | Klauck et al. | 524/158 |
| 5,312,865 | 5/1994 | Hoefer et al. | 524/591 |
| 5,397,646 | 3/1995 | Nickle et al. | 428/423.1 |

FOREIGN PATENT DOCUMENTS 308 115  3/1989  European Pat. Off.

*Primary Examiner*—Patrick Niland
*Attorney, Agent, or Firm*—Dennis G. Millman; Kenneth J. Stachel

[57] ABSTRACT

Aqueous dispersions of urethane polymers are disclosed that provide water-based coating compositions with good adhesion following humidity exposure. The polyurethane is made from a first and a second polyisocyanate, the first polyisocyanate having at least one open carbon chain greater than six carbon atoms in length between two isocyanate groups, preferably at least eight carbon atoms in length. The dispersion is particularly useful as a binder resin in coating compositions having pigments that normally have a detrimental effect on adhesion.

6 Claims, No Drawings

AQUEOUS URETHANE RESINS AND COATING COMPOSITINS HAVING ENHANCED HUMIDITY RESISTANCE

BACKGROUND OF THE INVENTION

The present invention relates to aqueous polymer dispersions comprising polyurethanes useful in coating compositions.

In producing water-based polyurethane resins for use in coating compositions, it is desirable to achieve a combination of properties including gloss, flexibility, durability, abrasion resistance, and solvent resistance. A particular problem encountered with at least some water-based polyurethane coating compositions has been a loss of adhesion when the cured coating is exposed to humid conditions. This problem is particularly troublesome in situations where a waterborne, pigmented basecoat is combined with a solvent-borne topcoat. This is encountered in color-plus-clear automobile coatings. It would be very desirable to provide aqueous polyurethane basecoat compositions that avoid this problem. Adhesion problems have been found to be exacerbated by some pigments that are used in coating compositions. White pigmented coatings have been found to be particularly susceptible to loss of adhesion following humidity exposure. The following prior art attempts at producing water-based polyurethanes do not address the humidity resistance problem.

U.S. Pat. No. 3,705,164 (Honig et al.) discloses a process for making stable aqueous polymer dispersions by subjecting vinyl monomers (e.g., acrylics) to emulsion polymerization in the presence of a stable aqueous dispersion of a polyurethane containing anionic groups. Coatings are disclosed as a use of the resulting polymer dispersions.

U.S. Pat. No. 4,198,330 (Kaizerman et al.) discloses modifying an aqueous polyurethane by means of vinyl monomers by a process similar to that of the U.S. Pat No. 3,705,164.

U.S. Pat. No. 4,644,030 (Loewrigkeit et al.) discloses a method for making an aqueous dispersion of polyurethane by first producing an isocyanate-terminated polyurethane prepolymer in ethylenically unsaturated monomers such as acrylates. The polyurethane prepolymer is then dispersed in water and is chain-extended. Thereafter the unsaturated monomer material is polymerized in situ in the aqueous dispersion.

EP-A-0 308 115 discloses an aqueous polymer dispersion containing an anionic water-dispersible polyurethane and a vinyl polymer obtained by a process similar to that of the 4,644,030 patent.

U.S. Pat. No. 4,318,833 (Guagliardo) discloses a waterborne polyurethane/acrylate in which the acrylate portion is dominant.

U.S. Pat. No. 4,791,168 (Salatin et al.) relates to incorporating polyesters made from long-chain carboxylic acids into waterborne polyurethane resins.

U.S. Pat. No. 5,118,752 (Chang et al.) discloses aqueous polymerization of vinyl monomers, including acrylates, in the presence of a polymeric surfactant containing urethane groups and silane groups. Among the isocyanates used to make the urethane portion of the surfactant is included a hydrophobic isocyanate ("DDI" diisocyanate). A comparative example without silane groups is also disclosed, but is reported in the patent to perform poorly. All of the examples disclosed in the patent employ a substantially larger amount of vinyl polymer relative to the polyurethane polymer, and the vinyl portion is predominately styrene.

U.S. Pat. No. 5,173,526 (Vijayendran et al.) involves a method for making aqueous polyurethane/acrylates similar to Chang et al., except that no silane groups are included, no hydrophobic isocyanates are used, and the use of an oil-soluble initiator is required. The resulting aqueous polymer dispersion is intended for use in paper coatings.

Subject matter related to that of the present application is disclosed and claimed in co-pending, commonly owned U.S. patent application Ser. No. 08/668,069 titled "Humidity Resistant Aqueous Urethane/Acrylic Resins and Coating Compositions" filed on even date herewith by Anbazhagan Natesh, Shanti Swarup, Mary E. Rosenberger, Mary S. Eifert, Karl F. Schimmel, and John W. Burgman.

SUMMARY OF THE INVENTION

It has now been found that aqueous dispersions of urethane polymers can be made that provide water-based coating compositions with good humidity resistance as well as a combination of performance properties required for commercial coating uses. Coatings in which the film-forming resin includes the urethane dispersion of the present invention have been found to possess superior adhesion properties. These adhesion properties have been found to be particularly advantageous in certain pigmented coating compositions, particularly white pigmented coatings. Characterizing the polyurethane of the present invention is the selection of polyisocyanates from which it is synthesized. A first polyisocyanate is characterized by at least one open carbon chain greater than six carbon atoms in length, preferably at least eight carbon atoms in length, between two isocyanate groups. For the sake of reduced cost and providing a range of coating properties, this first polyisocyanate may be combined with one or more different polyisocyanates selected from the more conventional types of polyisocyanates that are used for coatings. Therefore, the first polyisocyanate preferably constitutes a minor portion of the polyisocyanate mixture, e.g., 20% to 50% by weight of the polyisocyanate mixture, although greater amounts are not precluded. The best resistance to water in the cured coatings have been found in embodiments in which the first polyisocyanate constituted at least 25% of the polyisocyanate mixture, preferably at least 30%.

The first polyisocyanate, at least one additional polyisocyanate, an active hydrogen containing compound (e.g., a polyol), and an isocyanate-reactive compound containing a salt-forming group are reacted to form a polyurethane prepolymer, which is then neutralized, dispersed in water, and chain-extended. The first polyisocyanate preferably constitutes at least about 10 weight percent of all the monomers used to make the polyurethane.

The aqueous polyurethane dispersions can be formulated into coating compositions that can be applied to metal substrates, as well as to temperature sensitive substrates such as plastics and wood because curing of the coating can take place at ambient temperatures. Optionally, thermally activated crosslinking agents may be included. The coatings have found utility in the original manufacture of automobiles, low temperature refinish coating of automobiles, and low temperature coating of plastic articles.

The coating composition of the present invention is particularly useful as a pigmented waterborne basecoat to which is applied a clear topcoat, such as a two-component isocyanate coating. When the clear top coat is based on organic solvent-borne resins, the susceptibility of a waterborne basecoat to deterioration of adhesion due to humidity exposure is particularly critical, and the composition of the present invention is particularly adapted to resist such deterioration. This advantage has been found even with pigments such as titanium dioxide that were previously found to have a negative effect on adhesion.

DETAILED DESCRIPTION OF THE INVENTION

The aqueous polyurethane dispersion of the present invention may be prepared by forming an isocyanate-terminated polyurethane prepolymer including salt-forming groups sufficient to permit dispersion of the prepolymer in water, adding a neutralizing agent to the prepolymer to salify the ion-forming groups, dispersing the prepolymer in water, adding a chain extender to the aqueous dispersion, and completing the chain extension of the polyurethane prepolymer.

The polyurethane prepolymers may be produced by reacting organic material containing an average of at least about two active hydrogen atoms per molecule (usually a diol, typically a polyester polyol) with a stoichiometric excess of a polyisocyanate mixture. Additionally, the reactants for forming the prepolymer include an additional monomer reactive with isocyanate and having a salt-forming group for providing water dispersibility to the prepolymer.

To attain the results of the present invention, it is important that the polyisocyanate prepolymer be made from at least one polyisocyanate having at least one open chain alkylene group greater than $C_6$ in length between isocyanate groups, preferably at least $C_8$ in length. This first isocyanate may additionally include aliphatic, cycloaliphatic, araliphatic or aromatic segments. It is believed that the presence of the alkylene group contributes to the improved humidity resistance exhibited by the coatings of the present invention. A particular type of polyisocyanate of this type that has been found suitable for use as the first polyisocyanate is characterized by the structure:

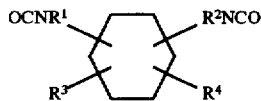

where $R^1$, $R^2$, $R^3$, and $R^4$ may be the same or different. $R^1$ and $R^2$ each contain alkylene groups greater than $C_6$ in length (preferably at least $C_8$), and $R^3$ and $R^4$ each are H or an alkyl group. Preferably both of $R^3$ and $R^4$ are alkyl groups. In general, longer alkyl or alkylene groups provide greater hydrophobicity to the prepolymer, which is desirable. Although no upper limit has been identified, appropriate compounds having alkylene groups longer than $C_{20}$ are uncommon. An example of such a polyisocyanate is "DDI® 1410" diisocyanate available from the Henkel Corporation, which is 2-heptyl-3,4-bis(9-isocyanato nonyl)-1-pentylcyclohexane.

Although polyisocyanates of the above-described first type may theoretically be used for the entire isocyanate content of the prepolymer, practical considerations such as cost generally limit them to no more than 50 percent by weight of the isocyanate monomer content. Providing a second polyisocyanate also permits additional attributes to be imparted to the product. In the particular embodiments tested, the advantages of the present invention were not perceptible when the first polyisocyanate was used in amounts less than about 20 percent by weight of the total polyisocyanate mixture. Significant improvements may be obtained when the first polyisocyanate constitutes at least 25 percent of the polyisocyanate mixture, and optimum results were obtained at levels of at least 30 percent. The remainder of the polyisocyanate mixture may constitute a second polyisocyanate of a more conventional type.

Polyisocyanates that may be used as the second polyisocyanate in making the prepolymer may be selected from a wide range of polyisocyanate compounds considered suitable for coating applications. These include aliphatic, cycloaliphatic, araliphatic or aromatic polyisocyanates. Examples of suitable polyisocyanates include ethylene diisocyanate, 1,6-hexamethylene diisocyanate, isophorone diisocyanate, cyclohexane-1,4-diisocyanate, 4,4'-dicyclohexylmethane diisocyanate, 1,4-phenylene diisocyanate, 2,4-toluene diisocyanate, 2,6-toluene diisocyanate, 4,4'-diphenylmethane diisocyanate, 2,4'-diphenylmethane diisocyanate, polymethylene polyphenyl polyisocyanates and 1,5-naphthylene diisocyanate. The second isocyanate may also include mixtures of polyisocyanates.

The polyol component reacted with the polyisocyanates to form the polyurethane prepolymer may be members of any of the chemical classes of polymeric polyols used or proposed to be used in polyurethane formulations. Low molecular weight diols could possibly be used, but it is preferred to use polymeric polyols for at least a portion of the polyol component for the sake of flexibility in the coating. Polymeric polyols having molecular weights in the range of 200–6000 are typical. In particular, the polyols may be polyesters, polyesteramides, polyethers, polythioethers, polycarbonates, polyacetals, polyolefins or polysiloxanes. Polyester polyols are particularly preferred and include hydroxyl-terminated reaction products of polyhydric alcohols such as ethylene glycol, propylene glycol, diethylene glycol, neopentyl glycol, 1,4-butanediol, furan dimethanol, cyclohexane dimethanol, glycerol, trimethylolpropane or pentaerythritol, or mixtures thereof, with polycarboxylic acids, especially dicarboxylic acids or their ester-forming derivatives, for example succinic, glutaric, and adipic acids or their methyl esters, phthalic anhydride, or dimethyl terephthalate. Polyesters obtained by the polymerization of lactones, for example caprolactone, in conjunction with the polyol may also be used. Polyesteramides may be obtained by the inclusion of amino-alcohols such as ethanolamine in the polyesterification mixtures.

To provide for water dispersibility, the monomer mixture used to produce the polyurethane prepolymer may include isocyanate-reactive compounds containing salt forming groups. Most conveniently, the polymer is made anionic, whereby the salt-forming group may be a carboxylic acid group which can subsequently be neutralized to salt form. In that case, the monomer can be a polyol having a carboxylic acid group. These include carboxy group containing diols and triols, for example dihydroxyalkanoic acids of the formula

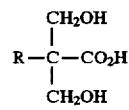

wherein R is hydrogen or a $C_1$–$C_{10}$ alkyl group. Specific examples of isocyanate-reactive acids include 2,2-di (hydroxymethyl)acetic acid, 2,2,2-tri(hydroxymethyl)acetic acid, 2,2-di(hydroxymethyl)butyric acid, 2,2-di (hydroxymethyl)pentanoic acid, and the like. The preferred carboxy-containing diol is 2,2-di(hydroxymethyl)propionic acid. If desired, the carboxy-containing diol or triol may be incorporated into a polyester by reaction with a dicarboxylic acid before being incorporated into the prepolymer. The concentration of salt-forming groups is chosen so as to provide stability to the aqueous dispersion of the prepolymer in water. This will vary in accordance with the hydrophobicity of the particular polymer. For the best results, the acid number for the final polyurethane dispersion may be in the range of 1 to 125 milligrams KOH per gram of polymer solids, preferably 5 to 100.

The anionic, water-dispersible, isocyanate-terminated polyurethane prepolymer may be prepared in conventional manner by reacting a stoichiometric excess of the polyisocyanates with the polymeric polyols under substantially anhydrous conditions at a temperature between about 30° C. and 130° C. until the reaction between the isocyanate groups and the hydroxyl groups is substantially complete. The polyisocyanate and the polyol components are suitably reacted in such proportions that the ratio of number of isocyanate groups to the number of hydroxyl groups is in the range from about 1.1:1 to about 6:1, preferably within the range of from 1.5:1 to 3:1. If desired, the well-known tin catalysts may be used to assist prepolymer formation.

Before the prepolymer is dispersed in water, ammonia or a water soluble or dispersible amine is added to the mixture in an amount sufficient to substantially neutralize the carboxylic functionality as is well known in the art. The amine is added at about 65 to 120% amine equivalent per equivalent of carboxy functionality, preferably about 80% to 100%. Amines that may be used for neutralization are relatively volatile so that they may evaporate from the coating upon curing. Ammonia, or primary, secondary, or tertiary aliphatic, alicyclic, aromatic, araliphatic or heterocyclic amines may be used. Amines with hydroxy substituted alkyl groups may also be suitable. Examples of amines include diethylamine, diethanolamine, diisopropanolamine, 2-methyl-2-aminopropanol, triethylamine, dimethylethanolamine, methyldiethanolamine, and methyldiethylamine. The prepolymer/vinyl monomer mixture may be dispersed in water using techniques well known in the art. Preferably, the mixture is added to the water with agitation, or, alternatively, water may be stirred into the mixture.

The polyurethane prepolymer is preferably chain extended by addition of an active hydrogen-containing compound to the aqueous system. The chain extender may be a polyol, an amino alcohol, ammonia, or a primary or a secondary aliphatic, alicyclic, aromatic, araliphatic or heterocyclic amine, especially a diamine. Examples of suitable chain extenders include ethylenediamine, diethylene triamine, triethylene tetramine, propylene diamine, butylene diamine, pentane diamine, hexamethylene diamine, cyclohexylene diamine, piperazine, 2-methyl piperazine, phenylene diamine, toluene diamine, tris(2-aminoethyl)amine, 4,4'-methylenebis(2-chloraniline), 3,Y-dichloro-4,4'-diphenyl diamine, 2,6-diaminopyridine, 4,4'-diaminodiphenyl methane, isopherone diamine, and adducts of diethylenetriamine with acrylate or its hydrolyzed products. Also suitable are amines as above having substitutions in the alkyl groups.

The amount of chain extender employed should be approximately equivalent to the free isocyanate groups in the prepolymer, the ratio of active hydrogens in the chain extender to isocyanate groups in the prepolymer preferably being in the range from 0.7 to 1.3:1. When water is employed as the chain extender, these ratios will not be applicable since the water, functioning as both a chain extender and dispersing medium, will be present in a gross excess relative to the free isocyanate groups. The chain extending reaction begins to proceed upon addition of the chain extender to the aqueous dispersion.

The polymer dispersions obtained typically comprise 20 to 60 weight percent solids and may be employed as coating compositions and applied to any substrate including metals, plastics glass, wood, cloth, leather, paper, foam and the like by any conventional method including brushing, dipping, flow coating, spraying and the like. Generally, a coating of the aqueous composition is dried and cured at temperatures ranging from ambient to about 150° C. for times ranging from 24 hours to 30 minutes. This is advantageous for use on plastics and for refinish coating of automobiles. Alternatively, any of the thermally activated crosslinking agents commonly used for coatings, such as the many commercially available aminoplast resins (e.g., alkoxylated melamine derivatives), may be included in the coating compositions. These coating compositions of the present invention that include a crosslinking agent may be cured at elevated temperatures. Embodiments that include crosslinking agents are preferred for original automobile manufacturing applications. Other crosslinking mechanisms, such as the silane functionality required by U.S. Pat. No. 5,118,752 (Chang et al.), are not required in the present invention, and are preferably avoided in order to obtain the humidity resistance found in the coatings of the present invention. Accordingly, the polyurethane polymer of the present invention is preferably substantially free of silane groups.

EXAMPLE 1

An aqueous polyurethane polymeric dispersion in accordance with the present invention was made using the ingredients as follows:

| Feed | Ingredient | Parts by weight |
| --- | --- | --- |
| 1. | Methylene dicyclohexyl diisocyanate[1] | 340.0 |
| 2. | DDI ® 1410 diisocyanate[2] | 197.2 |
| 3. | FORMREZ ® 66–56[3] | 546.6 |
| 4. | Dibutyltin dilaurate | 0.96 |
| 5. | Dimethylol propionic acid | 72.0 |
| 6. | Methyl isobutyl ketone | 266.2 |
| 7. | Neopentyl glycol | 12.0 |
| 8. | Triethyl amine | 54.3 |
| 9. | Ethylene diamine | 34.2 |
| 10. | Deionized water | 3260.2 |

[1]DESMODUR ® W from Bayer Corp., Pittsburgh, Pennsylvania.
[2]2-heptyl-3,4-bis(9-isocyanato nonyl)-1-pentyl-cyclohexane from Henkel Corporation.
[3]Poly(1,6-hexanediol adipate), molecular weight about 2000, from Witco Corporation.

Into a clean dry reactor equipped with heating, cooling, stirring and a nitrogen blanket were charged feeds 1 to 7. The reaction mixture was heated to 75° C. and brought to equilibrium. The temperature was then raised to about 97° C. and held at this temperature for 2 hours. After this hold, the temperature was reduced to 65° C. and feed 8 was added. The prepolymer/monomer mixture was then transferred into another reactor containing feeds 9 and 10. The resulting dispersion was heated to 40° C., and held for one hour. The product thus formed had the following physical properties: total solids of 26.6% and acid value of 7.3.

EXAMPLE 2

Although not required by the present invention, a preferred coating composition embodying the present invention may include, for the sake of additional property enhancements, an additive component comprising a cellulose acetate butyrate/acrylic dispersion, the preparation of which is described in this example. This material is the subject matter of co-pending, commonly owned U.S. patent application Ser. No. 08/669,815 titled "Stable Aqueous Dispersions of Cellulose Esters, Method of Making and Their Use in Coatings" filed on even date herewith by Suryya K. Das et al.

A pre-emulsion of cellulose acetate butyrate and acrylic monomer mixture was prepared by dissolving 158.0 grams of cellulose acetate butyrate (CAB-551-0.01, available from Eastman Chemical Co., USA) in 577.8 grams of n-butyl acrylate by stirring at room temperature. Acrylic monomers (22.1 grams of 2-hydroxyethyl methacrylate, 18.9 grams of ethylene glycol dimethacrylate and 12.6 grams of acrylic acid) were added and the mixture was agitated for about 20 minutes before adding 14.8 grams of ALIPAL CO-436 anionic surfactant (ammonium salt of ethoxylated nonylphenol sulfate, from Rhone-Poulenc). After mixing for 10 minutes, 1000.0 grams of deionized water and 3 drops of FOAMKILL 649 defoamer (from Crucible Chemicals, Greenville, S.C.) were added and stirred for about 5 minutes for pre-emulsification.

The pre-emulsion was passed once through a M 110T Microfluidizer® emulsifier at 8000 psi to produce a microdispersion. While stirring the microdispersion at room temperature in a round bottom flask, a mixture of 1.34 grams of 1 percent aqueous solution of ferrous ammonium sulfate and 16.6 grams of deionized water was added the mixture, and the mixture was then heated to 40° C. under nitrogen. A solution of 2.6 grams of isoascorbic acid in 33.4 grams of deionized water was added rapidly and followed by the addition of the following solution over 10 minutes:

| Ingredients | Parts by weight |
| --- | --- |
| ALIPAL CO-436 | 7.4 |
| Deionized water | 154.6 |
| Tert-butylhydroperoxide | 3.6 |
| (70 percent active in water) | |

The temperature rose spontaneously to 92° C. The product was filtered to yield a latex with a resin content of 38.9 percent determined at 110° C. for one hour and a pH of 2.79. The pH of the latex was adjusted to 8.33 using 11.0 grams of N,N-dimethylethanolamine as a neutralizing agent.

EXAMPLE 3

The following is a white pigmented aqueous coating composition in accordance with the present invention employing the polyurethane dispersion of Example 1 and the additive of Example 2.

| Ingredient | Parts by weight |
| --- | --- |
| 1. Butyl CELLOSOLVE ®[1] | 37 |
| 2. Hexyl CELLOSOLVE ®[2] | 4 |
| 3. Polypropylene glycol[3] | 2.5 |
| 4. Deionized water | 72 |
| 5. Thickener[4] 1:1 aqueous solution | 3 |
| 6. Acid functional acrylic grind vehicle | 32 |
| 7. UV control package[5] | 11 |
| 8. RESIMENE ® 750 cross-linking agent[6] | 20 |
| 9. TiO2 pigment in acrylic paste | 324 |
| 10. Black pigment[7] | 2 |
| 11. Yellow pigment[8] | 2.5 |
| 12. Triethyl amine | 2 |
| 13. CAB dispersion of Example 2 | 184 |
| 14. Polyurethane dispersant of Example 1 | 111 |

| Ingredient | Parts by weight |
| --- | --- |
| 15. Mineral spirits | 41 |

[1] Ethylene glycol butyl ether solvent from Union Carbide Chemicals and Plastics Co.
[2] Ethylene glycol hexyl ether solvent from Union Carbide Chemicals and Plastics Co.
[3] Molecular weight approximately 425, from Arco Chemicals.
[4] Thickener sold by Imperial Chemical Industries under the name "ASE-68."
[5] UV control package includes combination of: CYAGARD 711 and CYAGARD 1790, both with antioxidants from Cytec Technology Corp.; SANDUVOR 3058 UV absorber from Clariant Industries; and CYASORB 1164 UV absorber from Cytec Technology Corp.
[6] Melamine derivative from Monsanto Chemical Co.
[7] Black pigment from Cabot Corporation.
[8] Yellow pigment from Columbian Chemical Co.

Ingredients 1 through 12 constitute a pigment paste that was prepared separately in a conventional pigment milling operation. The paste was then let down by addition of ingredients 13 through 15. The resulting coating composition was tested for performance by spray application onto steel panels previously coated with a primer coating. The panels were baked for 35 minutes at 146° C. and tested for adhesion and chip resistance.

The cured films were evaluated for humidity resistance and where found to have good humidity resistance properties. The cured films of this example were also tested for resistance to chipping due to stone impact, and were found to have excellent resistance. Therefore, this composition met very high standards for automobile manufacturers.

Although certain embodiments of the invention have been described in detail for the purpose of illustrating the best mode of the invention, it is to be understood that such detail is solely for that purpose and that variations can be made by those skilled in the art without departing from the spirit and scope of the invention as defined by the claims.

We claim:

1. A dispersion in water of a chain extended polyurethane resin which consists essentially of the reaction product of:

(i) 8–25 percent by weight of a first polyisocyanate having a structure:

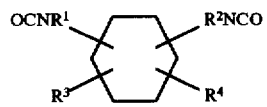

where $R^1$, $R^2$, $R^3$, and $R^4$ may be the same or different, $R^1$ and $R^2$ each contain alkylene groups greater than $C_6$ in length, and $R^3$ and $R^4$ each are H or an alkyl group (ii) 15–50 percent by weight of at least one second isocyanate different from the first polyisocyanate and selected from the group consisting of: aliphatic polyisocyanates; cycloaliphatic polyisocyanates; araliphatic polyisocyanates; isophorone diisocyanate; 1,4-phenylene diisocyanate; 2,4-toluene diisocyanate; 2,6-toluene diisocyanate; 4,4'-diphenylmethane diisocyanate; 2,4-diphenylmethane diisocyanate; polymethylene polyphenyl polyisocyanates; 1,5-naphthylene diisocyanate; and mixtures thereof, where the weight percentages are based on total resin solids weight of the polyurethane reactants;

(iii) at least one polyol; and (iv) at least one monomer having an anionic salt-forming group and functionality reactive with isocyanate.

2. The resin of claim 1 wherein the polyol and monomer with an anionic salt-forming group for the polyurethane reaction product are present in amounts of:

(i) 25–70 percent by weight for said polyol; and (ii) 1–10 percent by weight for said monomer having an anionic salt-forming group and functionality reactive with isocyanate, where the weight percentages are based on total resin solids weight of the polyurethane reactants.

3. The resin of claim 1 wherein the polyurethane is the reaction product consisting essentially, of:

(i) 10–20 percent by weight of said first polyisocyanate;

(ii) 20–40 percent by weight of said second isocyanate;

(iii) 40–60 percent by weight of said polyol; and (iv) 5–10 percent by weight of said monomer having an anionic salt-forming group and functionality reactive with isocyanate;

the weight percentages based on total resin solids weight of the polyurethane reactants.

4. The resin of claim 1 wherein $R^1$ and $R^2$ each contain alkylene groups at least $C_8$ in length, and $R^3$ and $R^4$ each are an alkyl group.

5. A coating composition comprising:

(a) a dispersion in water of a chain extended polyurethane resin consisting essentially of the reaction product of:

(i) 8–25 percent by weight of a first polyisocyanate having a structure:

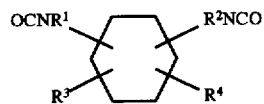

$R^1$, $R^2$, $R^3$, and $R^4$ may be the same or different, $R^1$ and $R^2$ each contain alkylene groups greater than $C_6$, in length, and $R^3$ and $R^4$ each are H or an alkyl group;

(ii) 15–50 percent by weight of at least one second isocyanate different from the first polyisocyanate and selected from the group consisting of; aliphatic polyisocyanates; cycloaliphatic polyisocyanates; araliphatic polyisocyanates; isophorone diisocyanate; 1,4-phenylene diisocyanate; 2,4-toluene diisocyanate; 2,6-toluene diisocyanate; 4,4'-diphenylmethane diisocyanate; 2,4-diphenylmethane diisocyanate; and polymethylene polyphenyl polyisocyanates; 1,5-naphthylene diisocyanate; and mixtures thereof;

(iii) at least one polyol; and (iv) at least one monomer having an anionic group and functionality reactive with isocyanate;

(b) pigment; and (c) water.

6. The coating composition of claim 5 wherein the pigment comprises titanium dioxide.

* * * * *